United States Patent [19]

Nicholson

[11] 4,203,608
[45] May 20, 1980

[54] CORRUGATED GASKETS

[76] Inventor: Terence P. Nicholson, Calf Hall, Muggleswick, nr. Derwentside, Co. Durham, England

[21] Appl. No.: 930,429

[22] Filed: Aug. 2, 1978

[30] Foreign Application Priority Data

Feb. 2, 1978 [GB] United Kingdom ............... 4350/78

[51] Int. Cl.² .................................................. F16J 15/08
[52] U.S. Cl. ........................... 277/235 B; 277/213; 277/236
[58] Field of Search .................. 277/207 R, 213, 214, 277/215, 235 R, 235 B, 236

[56] References Cited

U.S. PATENT DOCUMENTS 3,240,501  3/1966  Smith ........................... 277/213 X

FOREIGN PATENT DOCUMENTS

| | | | |
|---|---|---|---|
| 893598 | 10/1953 | Fed. Rep. of Germany | 277/235 B |
| 1003523 | 2/1957 | Fed. Rep. of Germany | 277/235 B |
| 1367422 | 6/1964 | France | 277/213 |
| 732576 | 6/1955 | United Kingdom | 277/235 B |
| 1033507 | 6/1966 | United Kingdom | 277/235 B |

*Primary Examiner*—Robert S. Ward, Jr.

[57] ABSTRACT

A corrugated gasket particularly intended for ensuring liquid and gas tight joints between opposed solid surfaces in automotive engineering has a double waveform section configuration wherein the distance between a plane which contains the apexes of the two waves and a plane parallel thereto which contains the base of the trough between the two waves is significantly less than the distance between the first plane and the base plane of the gasket.

3 Claims, 13 Drawing Figures

CORRUGATED GASKETS

This invention relates to corrugated gaskets such as are used particularly but not exclusively in automotive engineering for ensuring liquid and gas tight joints between opposed solid surfaces.

A common form of gasket used in the automotive industry is one which has, intermediate its inside and outside edges, a single wave-form corrugation of relatively slight depth. This form of gasket has given excellent service for many years but with the advent of pressurised water systems increased gas pressures and the more lightweight construction of modern engines it has ceased to be adequate and fully efficient for the job which it has to perform.

Even so various forms of corrugation have worked reasonably well when used around apertures which are circular but this is due entirely to the hoop stress in the ring.

When it comes to sealing apertures which are more or less rectangular in shape however the ability of the gasket to seal successfully drops at an alarming rate.

If there is a substantial amount of metal on each side of the corrugation to resist the compression of the corrugation without bending outwards during the compression of the gasket, then it will work reasonably well; providing however that the surfaces to be sealed have a good surface finish. However, if there is only a very limited amount of metal on each side of the corrugation, the metal simply bends outwards and inwards during compression, and because of this the material does not flow fully into the machining cord of the faces to be sealed and leakage occurs.

The present invention has been devised with the general object of providing an improved, more efficient and more versatile corrugated gasket than has hitherto been available.

In accordance with the present invention a corrugated gasket is characterised firstly by a corrugation having a double waveform sectional configuration and secondly in that the distance between a plane which contains the apexes of the two waves and a plane parallel thereto which contains the base of the trough between the two waves is significantly less than the distance between the first plane and the base plane of the gasket. In other words it may be said that in the double waveform configuration a gap exists between the median part of the configuration and the base plane of the gasket. The width of this gap may approximate to the thickness of the metal from which the gasket is made.

In order to appreciate the nature of the invention however, reference should be made to the accompanying drawings in which:

FIG. 1 is a radial cross-section of a typical known form of single waveform gasket;

FIGS. 2 and 3 diagrammatically illustrate the behaviour of two typical substantially rectangular gaskets under the effect of a compressive load;

FIGS. 4(a), 4(b), 4(c) and 4(d) illustrates some other typical waveform corrugations;

Figure 4A:
FIG. 4(e) illustrates a double waveform corrugation according to the present invention.
Figure 4B:
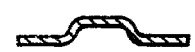
Figure 4C:
Figure 4D:
Figure 4E:
Figure 6:
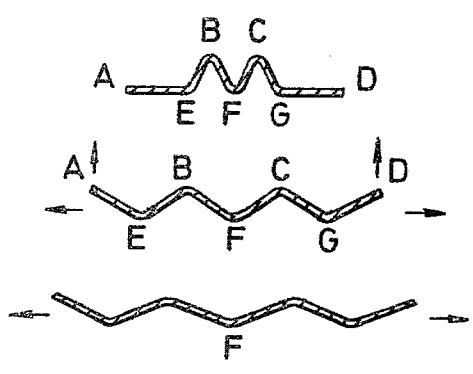
Figure 7:
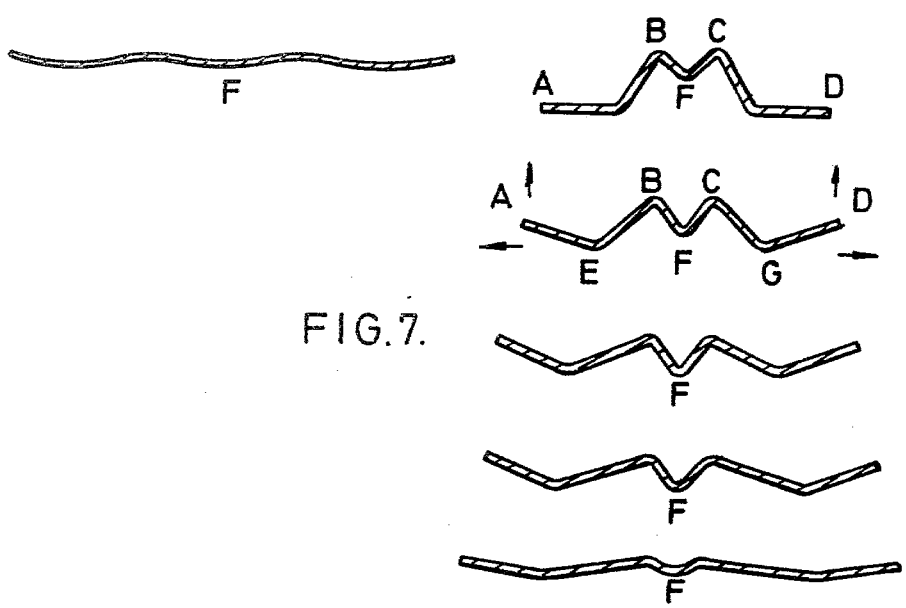
Figures 8, 9:
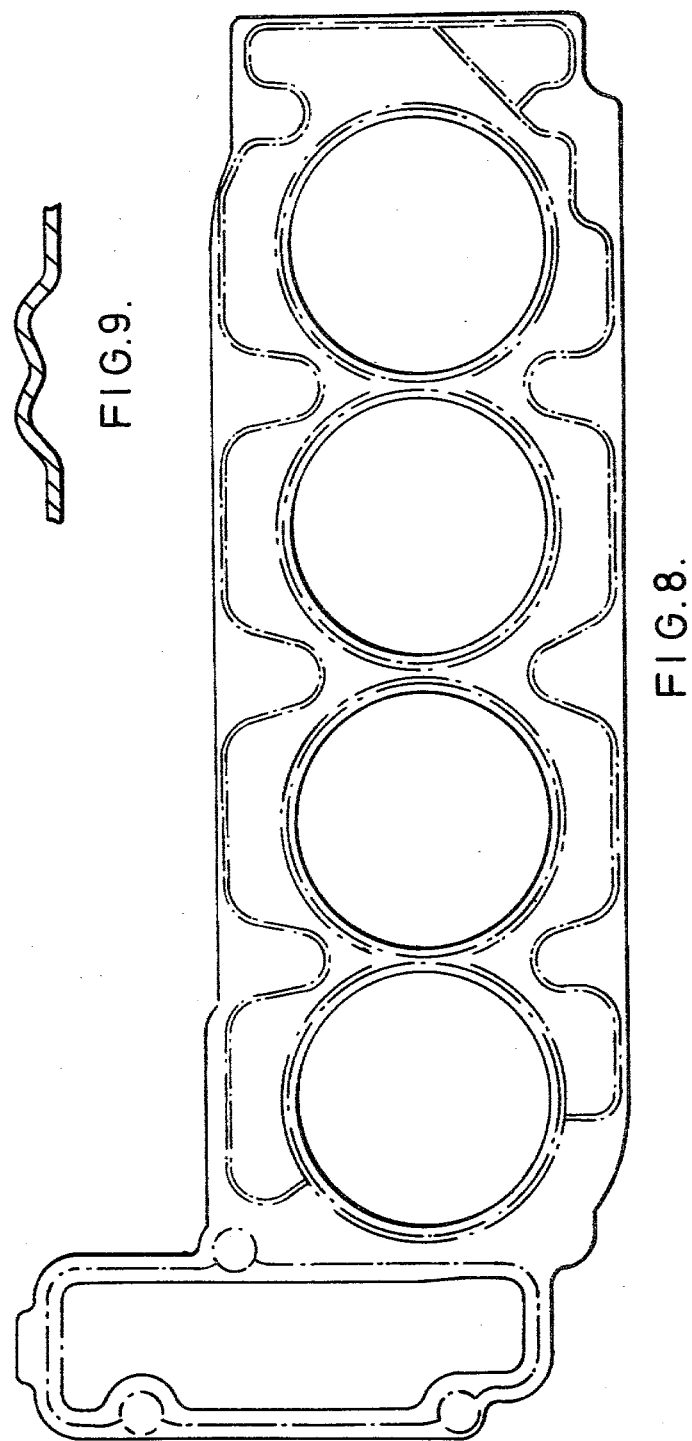

FIG. 6 similarly illustrates stages in the compression under load of the double waveform corrugation of FIG. 4(d);

FIG. 7 similarly illustrates stages in the compression under load of the double waveform corrugation of FIG. 4(e);

FIG. 8 is a plan view of a gasket showing a corrugation pattern for which the double waveform corrugation of the invention is suitable; and FIG. 9 is an enlarged detail of such double waveform corrugation.

Figure 1:
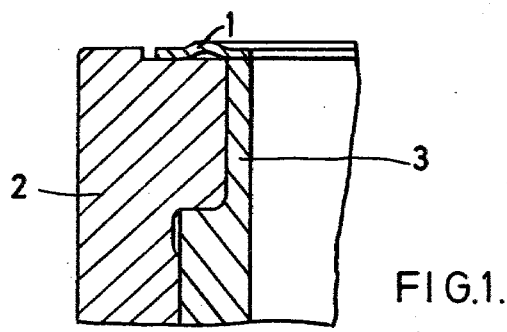

Referring now to the drawings, FIG. 1 show in radial cross-section a typical known form of annular gasekt 1 of single waveform configuration for sealing the joint between the elements 2 and 3 and another solid element (not shown) opposed thereto.

Figure 2:
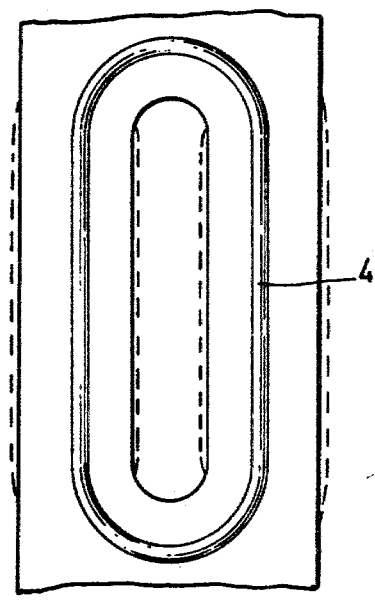
Figure 3:
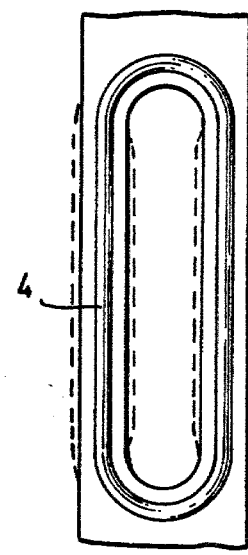

FIGS. 2 and 3 show fragmentarily two somewhat rectangular gaskets each having a continuous elongated corrugation 4 of single wave configuration. In each Figure the dashed lines show where the metal of the gasket spreads to when the gasket is compressed, from which it can be appreciated that under compression very little flow of metal into the machining cord of the faces to be sealed can occur.

FIGS. 4(a), 4(b), 4(c) and 4(d) respectively show known gasket corrugations of arcuate, flat, 'V' and double 'V' configuration none of which have been found to be as satisfactory as the double waveform configuration shown in FIG. 4(e) which, in accordance with the invention, has a gap between the median part of the configuration—i.e. the base of the central trough and the base plane of the gasket.

At first glance it might be said that there is very little difference if any between this latter double wave corrugation and the one illustrated in FIG. 4(d).

It is this difference however which makes the difference between a successful seal and one that fails.

The reason for such a form of corrugation being superior to others is due to the deformation which occurs during the compression of the gasket.

To fully appreciate this it is necessary to describe what happens when the forms of corrugation shown in FIGS. 4(a) to 4(d) inclusive are compressed and what occurs when the new proposed corrugation is compressed.

Figure 5:
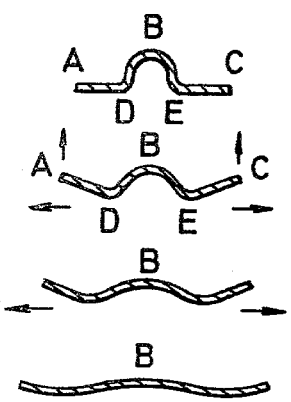
FIG. 5 illustrates stages in the compression under load of any of the corrugations of FIGS. 4(a), 4(b) or 4(c)

The deformation which occurs during compression is very similar for each of the corrugations shown in FIGS. 4(a) to 4(c) inclusive and is illustrated in FIG. 5.

During compression the position of median point B does not alter, but points D and E do spread out in the direction indicated by arrows, whilst at the same time points A and C turn upwards until level with the peak of corrugation B. As compression continues the points AD and EA continue to move as indicated until compression of the gasket is completed.

During the actual compression of the gasket the fact that point B is static indicates that the material will have cold flowed into an opposed surface and a perfect seal has been created at that point. This is not so at points D and E, due to gasket spreading, i.e. points D and E changing position—the material instead of flowing into the mating face has simply skidded over the mating surface, i.e. across the peaks of the machining cord of the face and because of this it is impossible for the gasket material to flow into and fill the grooves of the machining cord. The result is that no seal has been established.

With regard to the corrugation shown in FIG. 4(d) a similar deformation occurs but on a larger scale, as shown in FIG. 6.

When this corrugation is compressed only point F is static and because of this a seal is created at this point whereas with points E, B, C and G, moving outwards and inwards during compression as explained earlier the metal is simply skidding over the surface without effecting a seal.

As already stated these forms of corrugation can work reasonably well, providing the flat areas on each side of the corrugation are significantly substantial in width. However in practice the landing areas on which a seal has to be established have been so reduced over the years that it is in most cases impossible to establish a successful seal.

The action that occurs when the corrugation according to the invention is compressed will now be described with reference to FIG. 7.

When this corrugation is compressed the areas AE and GD spread outwards and upwards as illustrated BUT because there is a gap between the lower mating face and point F, points B and C remain static at which points the material flows into the upper mating face and a perfect seal established at these two points.

As compression continues AE and GD continue to spread outwards and inwards, skidding over the surface without establishing a seal.

However when the point F comes in contact with the lower mating face B and C are already firmly established against the upper mating face which prevents any movements of points B and C and as the compression continues until complete, the corrugation at point F cold flows into the lower mating surface to establish a perfect seal on the lower mating face.

Time and time again a corrugated gasket with this form of corrugation embossed in it has proved, under test conditions, superior to every other corrugated gasket tried.

This design, research and developement has resulted in the availability of a highly sophisticated relatively low-cost gasket, with particular application to the Automotive industry.

The gasket can be manufactured from any metal or combination of metals or metals and coatings to suit almost any application.

A typical example for an automotive Cylinder Head gasket is a steel gasket copper plated or zinc plated and which if so desired can be lacquered to prevent discolouration of facing as well as for sales appeal.

An actual and typical embodiment of a gasket embodying the characteristic double waveform corrugation W is shown in FIG. 8 and FIG. 9 shows details of the corrugation profile. In this particular and nonrestrictive example the strip thickness is 0.010 inches; the total corrugated length is 0.125 inches; the distance between wave crests is 0.063 inches; the depth from wave crest to base surface is 0.027 to 0.029 inches and the depth from wave crest to wave trough is 0.021 inches. The initial "gap" distance is therefore 0.006 to 0.008 inches.

I claim:

1. A gasket effecting a seal between two planar surfaces lying in opposition of each other comprising a sheet like member having in cross section a double wave form corrugation terminating in coplanar oppositely extending flanges defining the base plane of said gasket, the distance between the plane in which the crests of the two waves are contained and a plane parallel thereto in which the trough between said two waves is contained is significantly less than the distance between the plane of the crests and the base plane, said gasket being deformable on application of compressive forces normal to said planes to cause said oppositely extending flanges to move apart while maintaining the relative distance between said crest of said wave form.

2. A corrugated gasket as claimed in claim 1 wherein the difference between said distances approximates to the thickness of the metal from which the gasket is made.

3. The gasket according to claim 1 wherein said wave forms define an annular shape in the plane of said sheet.

* * * * *